(12) United States Patent
Graham et al.

(10) Patent No.: US 8,596,300 B2
(45) Date of Patent: Dec. 3, 2013

(54) AT-SURFACE TOOL FOR PULSE-INJECTION OF LIQUIDS

(75) Inventors: Benjamin Eric Graham, Marsden (CA); Andre Michael Masse, Edmonton (CA); Brett Charles Davidson, Cambridge (CA)

(73) Assignee: Wavefront Reservoir Technologies Ltd., Cambridge, Ontario (CA)

( * ) Notice: Subject to any disclaimer, the term of this patent is extended or adjusted under 35 U.S.C. 154(b) by 689 days.

(21) Appl. No.: 12/764,533

(22) Filed: Apr. 21, 2010

(65) Prior Publication Data

US 2010/0269914 A1 Oct. 28, 2010

(30) Foreign Application Priority Data

Apr. 24, 2009 (GB) .................................. 0907081.4

(51) Int. Cl.
*F15D 1/00* (2006.01)
*F16K 31/04* (2006.01)
(52) U.S. Cl.
USPC .............. 137/624.13; 137/624.15; 137/236.1; 251/174

(58) Field of Classification Search
USPC ............... 137/624.13, 624.11, 624.15, 236.1; 251/170, 174
See application file for complete search history.

(56) References Cited

U.S. PATENT DOCUMENTS

| 4,360,040 | A |   | 11/1982 | Core et al. |           |
|-----------|---|---|---------|-------------|-----------|
| 4,478,562 | A | * | 10/1984 | Schippers et al. | 137/624.13 |
| 4,953,595 | A |   | 9/1990  | Kotlyar     |           |
| 5,143,121 | A | * | 9/1992  | Steinhardt et al. | 137/624.13 |
| 6,050,299 | A | * | 4/2000  | Abrams et al. | 137/624.13 |
| 6,053,203 | A | * | 4/2000  | Sailor et al. | 137/624.13 |
| 6,962,169 | B2 | * | 11/2005 | Kaske       | 137/624.13 |
| 7,237,571 | B2 | * | 7/2007  | Morimoto et al. | 137/624.15 |
| 2006/0272821 | A1 |   | 12/2006 | Webb et al. |       |

FOREIGN PATENT DOCUMENTS

WO 2004113672 12/2004
WO 2008037069 4/2008

* cited by examiner

*Primary Examiner* — Kevin Lee
(74) *Attorney, Agent, or Firm* — Anthony Asquith Corp.

(57) ABSTRACT

For pulsed injection of liquids into the ground, the tool has a rotating cylinder, having through-slots. The tool has an insert, which is pressed against the rotating cylinder. As the cylinder rotates, the slots in the rotor cover/uncover the slots in the insert, creating the required pulses. By suitably shaping the slots, the pulses can have a fast rise-time from closed to open. The insert is shaped to minimize flow interference.

13 Claims, 7 Drawing Sheets

AT-SURFACE TOOL FOR PULSE-INJECTION OF LIQUIDS

The tool is intended for enhanced distribution of injection fluids in environmental site applications, such as waterflooding and in situ remedial injections.

The benefits are known of applying pulses to liquid that is being injected into the ground.

Designers know that a tool for creating pulses has to cater for a wide range of fluid pressures (from e.g 20 psi to e.g 1800 psi). The liquid can be water, oil, or heavy muddy sludges. Particulate matter can be present in varying quantities. Injection fluids can be dangerously corrosive. Under such a variety of conditions, a simple, scalable tool is preferred, which can be easily maintained and easily adjusted.

The relatively shallow depth of many environmental sites (e.g thirty meters) allows the pulses to be generated from a tool located at the surface, as opposed to being located downhole. Locating the tool downhole can pose problems of providing a mechanical drive to the tool, which are much simplified when the tool is at the surface.

The present tool may be regarded as a being based on a traditional ball-valve. By driving the ball to rotate continuously, a ball-valve can be so operated as to break up the flow of liquid into discrete pulses. The resulting pulse-creating tool is used in conjunction with a reservoir of the liquid to be injected, a motorized pump with power source, an accumulator, pressure controllers, instruments, and so on, and with a downhole-conduit for conveying the injected liquid, with pulses, down into the well, borehole, or other hole in the ground.

The pulses from a continuously-rotating ball-valve pulse-injection system have a number of advantageous performance characteristics. The generated pulses, for example, are of high amplitude of flowrate, because of the un-restricted flow path through a ball-valve. The system works well also for low-flow applications because a ball-valve has (or can have) zero leakage when closed. The ball-valve system works for high-pressure applications because tolerances can readily be maintained, within the valve's pressure rating. The tool is simple and easy to clean, and is lightweight and easily operable.

However, a traditional ball-valve does not have all the characteristics of a good pulse-creating tool. For example, the rise times of the pulses would not be rapid or sharp. That is to say, a ball-valve moves from fully-closed to fully-open only very slowly, whereas desirably a pulse-valve should open instantly, or almost instantly, and then should remain wide open during the injection-phase of the pulsing cycle. Also, preferably, a pulse-valve should close very rapidly, and remain fully closed during the closed-phase of the pulsing-cycle.

In a traditional ball valve, the valve opens slowly and non-linearly. In a pulse-creating tool of the kind as described herein, changes to the shapes of the ports in the ball, and to the shapes of the windows in the ball-housing, can enable the valve to go from fully-closed to fully-open in just a fraction of the swept arc of rotation of the ball, as compared with the slow opening rise-time (i.e with the long opening rise-arc) attributable to the ports and windows in a traditional ball-valve.

Although the pulse-creating tool of the kind as described herein could be based on a ball-valve, the preference is to replace the ball with a cylinder. It is generally easier (cheaper) to make, to mount, and also to seal, a rotating cylinder than a rotating ball.

LIST OF THE DRAWINGS

FIG. 4 (sh3) is a pictorial view, and . . . .

Figure 2A:
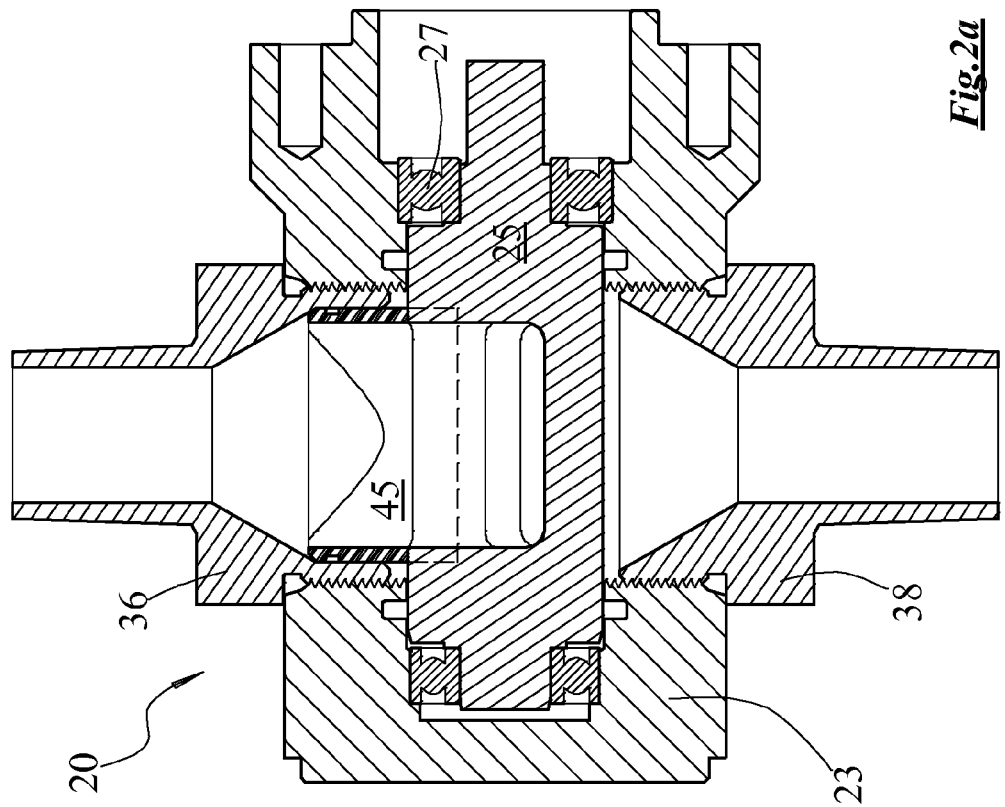
FIG. 2a (sh1) is a sectioned side-elevation of the tool of FIG. 1.
Figure 1:
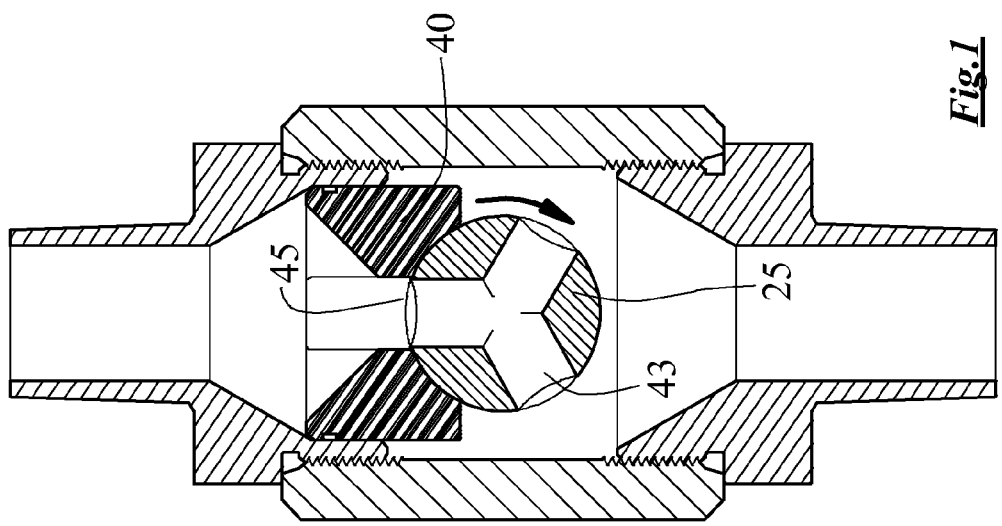
FIG. 1 (sh1) is a sectioned end-elevation of an exemplary pulsing-creating tool.
Figure 3:
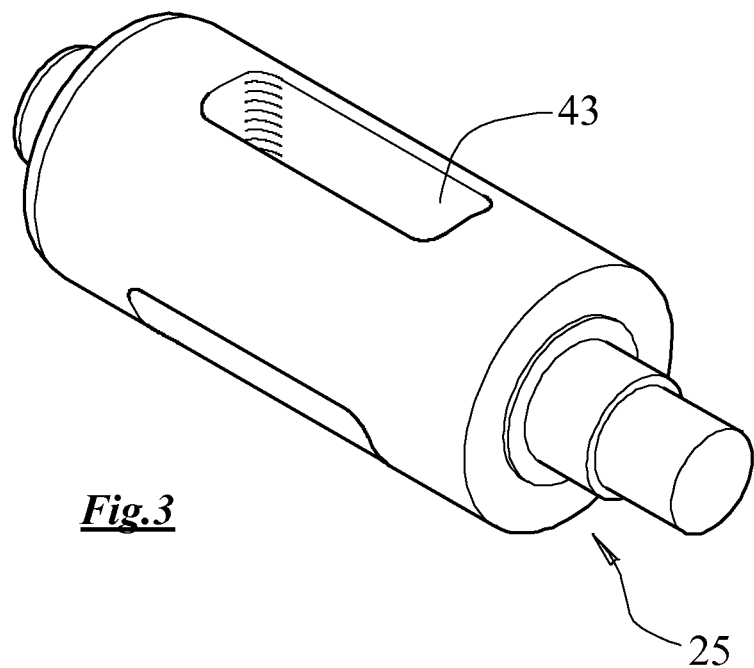
FIG. 3 (sh2) is a pictorial view of the rotor of the tool of FIG. 1.
Figure 2B:
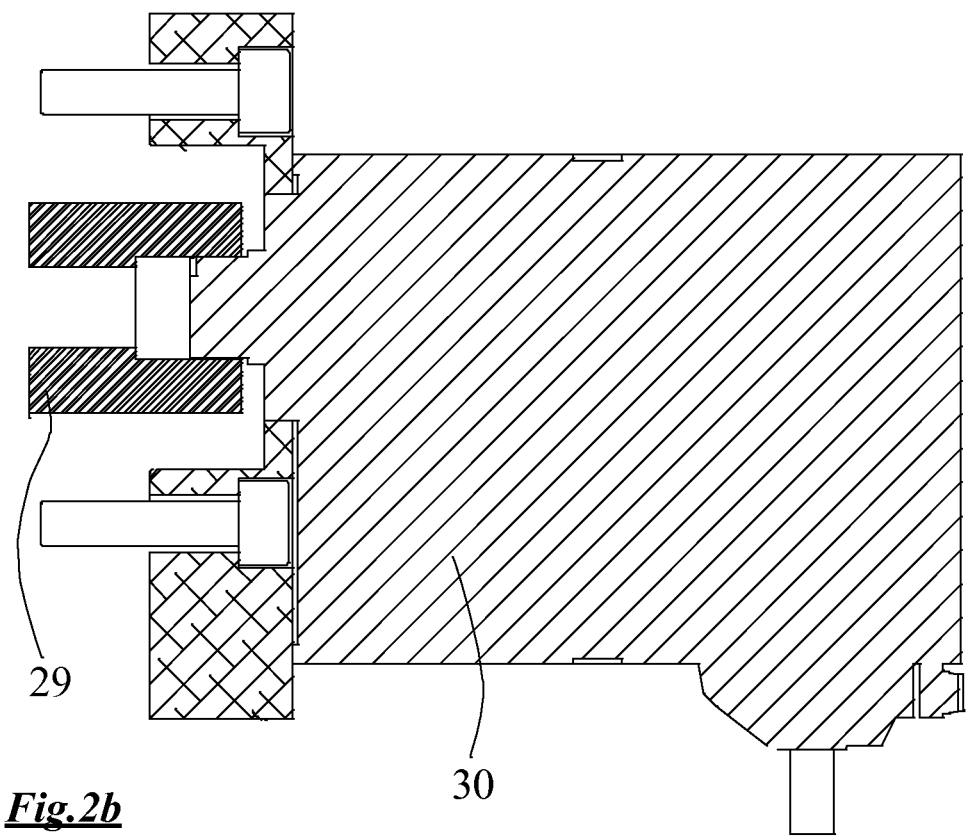
FIG. 2b (sh2) is a diagrammatic side-elevation of an electric motor, used to drive the rotor of the tool of FIG. 1
Figure 5:
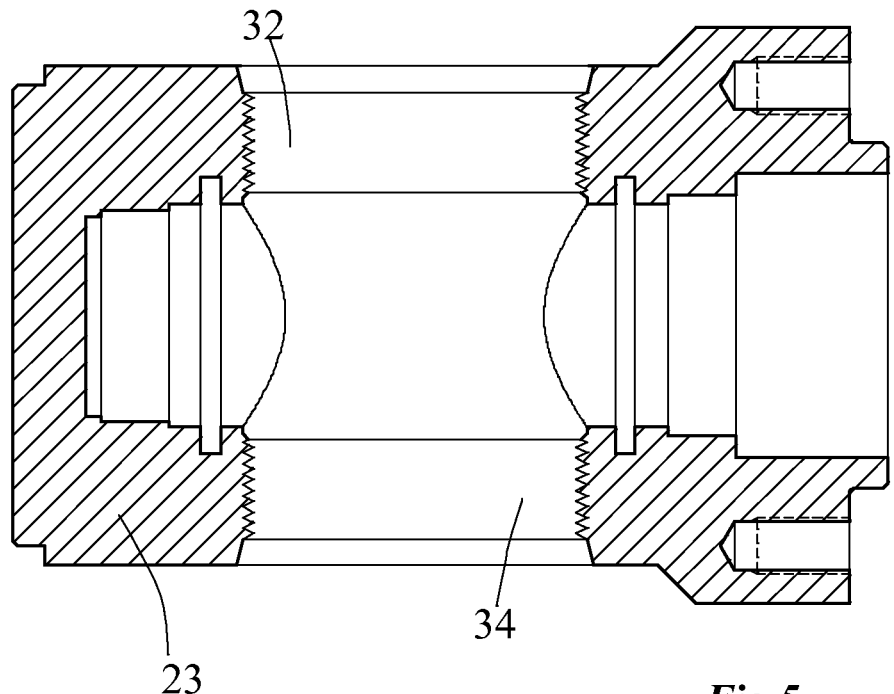
FIG. 5 (sh3) is a sectioned side-elevation, of the body of the tool of FIG. 1
Figure 4:
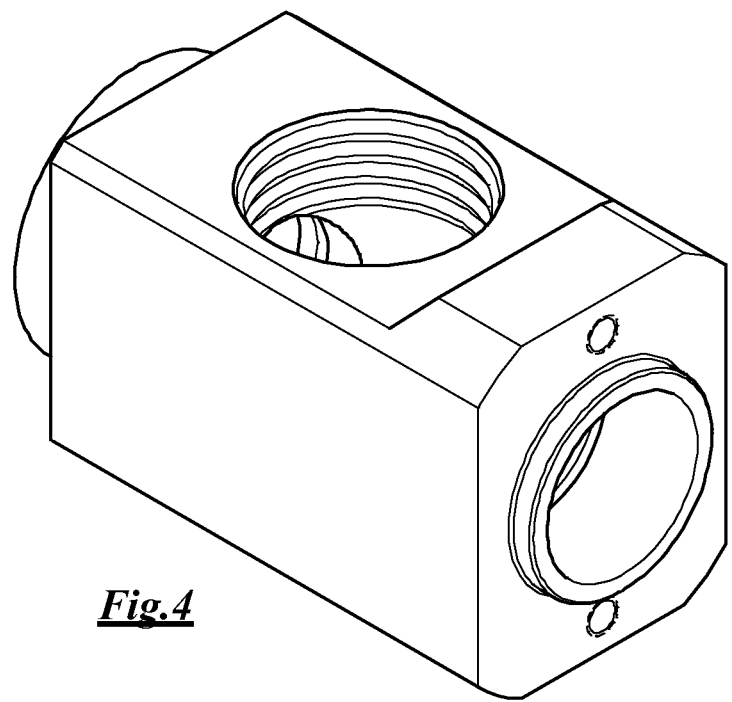
Figure 6A:
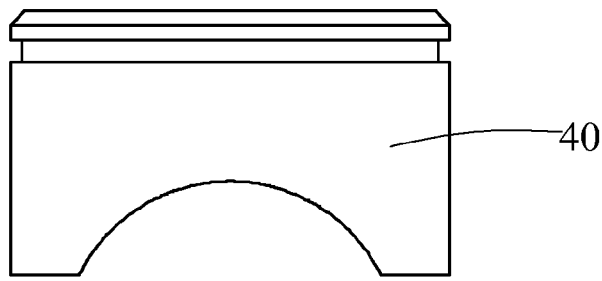
FIGS. 6a,6b,6c (sh4) are side, sectioned side, and bottom, views of the insert of the tool of FIG. 1.
Figure 6B:
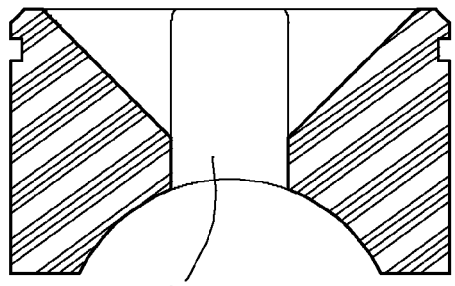
Figure 6C:
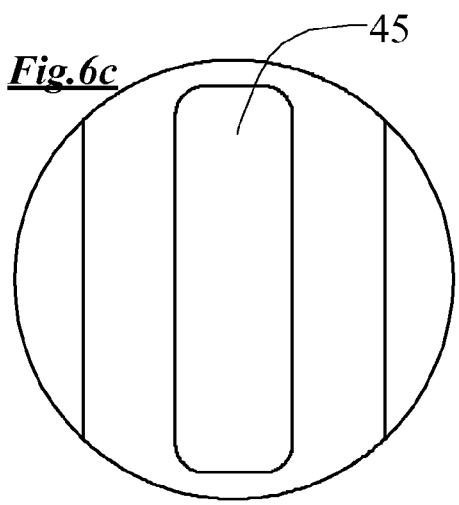
Figure 7A:
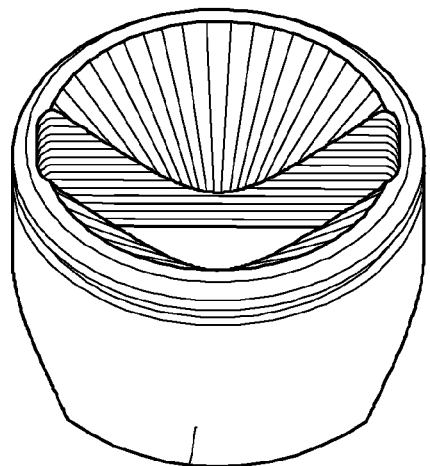
FIGS. 7a,7b (sh4) are over and under pictorial views of the insert of the tool of FIG. 1.
Figure 7B:
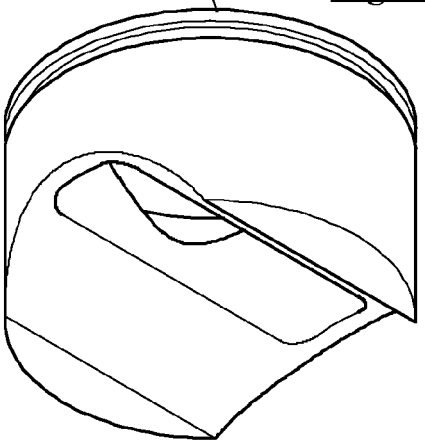
Figures 8, 9:
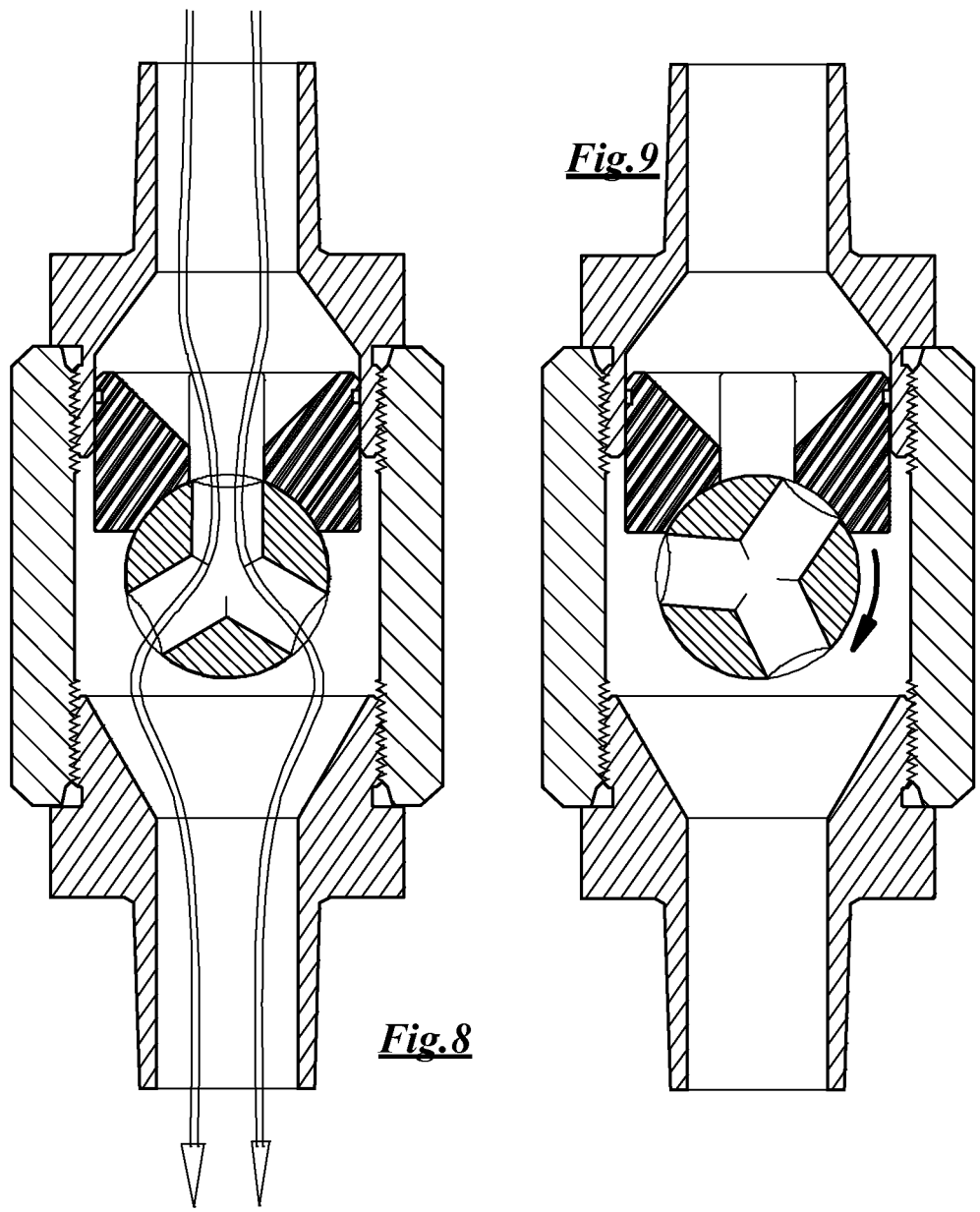
FIG. 8 (sh5) is the same view as FIG. 1, but includes arrows that show the flow of liquid through the tool during the injection-phase of the cyclic operation of the tool.
FIG. 9 (sh5) is the same view as FIG. 1, but shows the rotor rotated to a position in which the injection-phase is about to end, and the closed-phase of the operation of the tool is about to begin.

In FIGS. 1-9, the pulse-creating tool 20 includes a body 23. A rotor 25 rotates in bearings 27 in the body 23. A coupling 29 connects the rotor 25 to the armature of an electric motor 30, and the housing of the motor 30 is bolted to the body 23.

The rotor of the tool is required to rotate, typically up to 400 rpm or so. The bearings 27 of course are selected as being suitable for the speeds and loads applied. The thrust and journal loads on the rotor 25 are not large, however, and the bearing specification is not a demanding one. The bearings should be sealed in a manner appropriate to the liquids being injected.

The body 23 is formed with threaded holes 32,34, in which are fixed an inlet-connector 36 and an outlet-connector 38. An insert 40 is mounted inside the inlet-connector 36. Female curved-faces of the insert 40 rub against complementary male curved-faces of the rotor 25 during operation, being urged into contact with the rotor by the pressure of incoming water through the inlet-connector 36. The designer might, if desired, arrange for a spring, to maintain rubbing contact between the insert 40 and the rotor 25.

The rotor 25 contains three apertures, in the form of elongated rotor-slots 43. As the rotor 25 rotates, the rotor-slots 43 alternately align and misalign with respect to an insert-aperture, in the form of an elongated insert-slot 45, in the insert 40. When one of the rotor-slots 43 aligns with the insert-slot 45, the liquid can pass through the tool; when none of the rotor-slots 43 aligns with the insert-slot 45, the tool is closed to the passage of liquid therethrough. Thus, liquid is delivered through the outlet-connector 38 in pulses, when the rotor 25 is rotating.

The designer can vary the number of rotor-slots 43 in the rotor 25, from one to as many as can be physically accommodated within the rotor. The designer can provide the desired open-time versus closed-time ratio, and can so arrange the leading and trailing edges of the slots to ensure that the apertures open instantaneously, or gradually.

When the pulse-creating tool is located at the surface, it is a simple matter to change some of the components inside the tool, and thus to change the operating characteristics of the tool.

Parameters that can be varied from the surface during an injection program include the pressure of the incoming liquid (an accumulator should be provided, to maintain the incoming pressure at a reasonably uniform level), and the speed of the motor can be varied, to change the frequency of the pulses.

The insert 40 performs a number of functions. First, as to its shape, the insert is shaped to collect incoming flow from the inlet-connector 36, and to funnel the liquid into and through the insert-slot 45 with minimum interference to flow. It may be noted that it would be difficult to provide smooth gradual transitions if the flow paths had to be machined into the solid body 23, but the separate insert makes it a simple matter to provide the smooth transition.

Second, the insert 40 is movable, being guided for movement relative to the body 23, and therefore for movement relative to the rotor 25 (the rotor 25 being carried in bearings 27 in the body 23). The insert 40 can move radially towards and away from the rotating rotor. Therefore, the insert, upon being pressed against the rotor, provides good sealing therebetween. Also, a movable insert can accommodate some run-out of the rotor (though that should be minimized). The insert can be made of metal or plastic.

The apertures 43,45 are in the form of elongated slots. On the other hand, the flow passage in the connectors 36,38 is a round tube. Thus, a transition 47 is required to provide a smooth change from the round form to the elongated-slot form, and the transition in the insert provides that. The designer should see to it, in fact, that all flow passages present as little interference to the flow as possible, commensurate with the desire for the valve to open wide as rapidly as possible.

Figure 10:
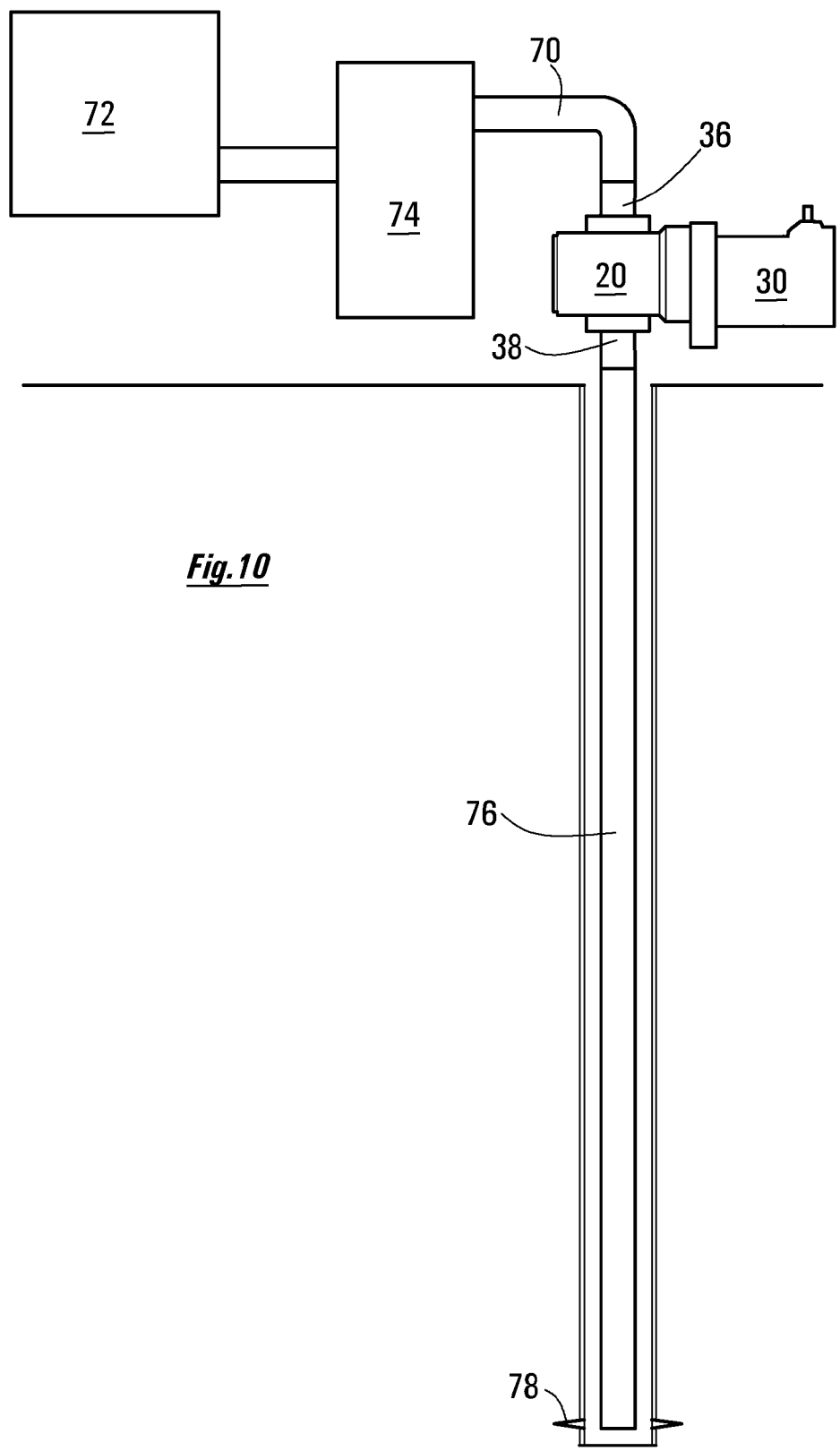
FIG. 10 (sh6) is a diagram showing the tool set up for use for downhole pulse-injection of a liquid into a well.

FIG. 10 is a view of the pulse-injection tool installed in a well. A reservoir-conduit 70 connects a reservoir 72 and an injection-pump 74 to the inlet-connector 36. A downhole-conduit 76 is connected to the outlet-connector 38, and extends down to the injection-depth in the well, i.e down to the perforations 78 in the well-casing.

Figure 11:
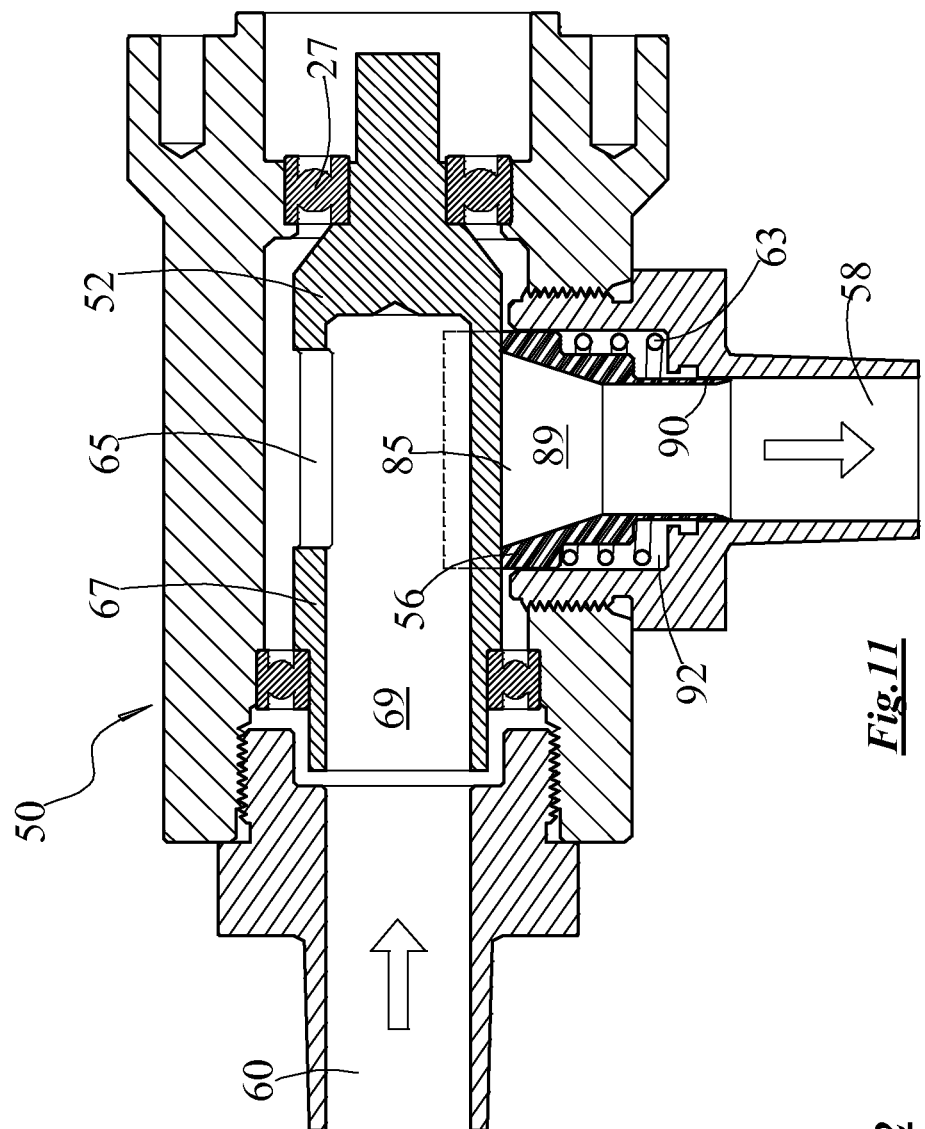
FIG. 11 (sh7) is a sectioned end-elevation of another pulse-injection tool.
Figure 12:
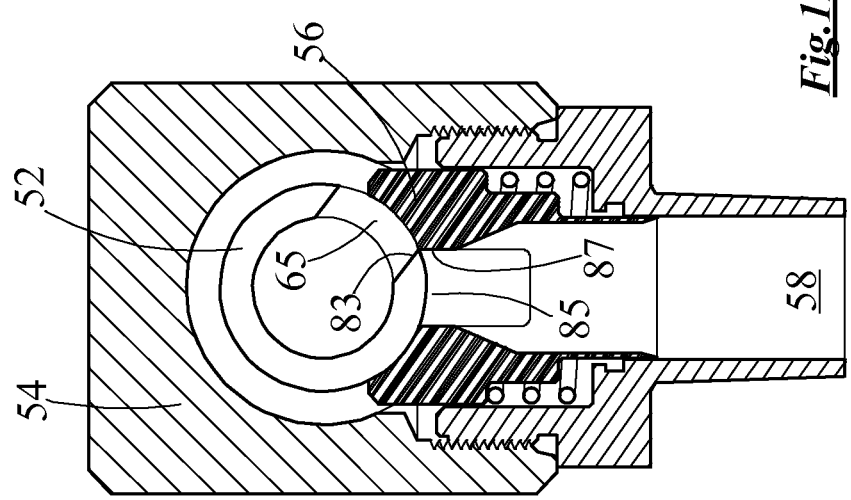
FIG. 12 (sh7) is a sectioned side-elevation of the tool of FIG. 11.

FIGS. 11,12 depict a variant of the pulse-creating tool. In the variant, the electric motor drive is the same as described previously. The rotor 52 is mounted for rotation, in bearings in the body 54, also in the manner as described previously.

The variant tool 50 differs from the previous tools in that now the insert 56 is associated with the outlet-connector 58 rather than with the inlet-connector 60, and also in that now the water enters the rotor 52 axially rather than radially. Also, in the variant 50, the insert 56 is biased against the rotor 52 by means of a spring 63, instead of (or in addition to) by means of an induced pressure differential acting on the insert 56.

The rotor 52 in FIGS. 11,12 is provided with just one rotor-slot 65. The rotor-slot passes right through the annular wall 67 of the hollow interior chamber 69 of the rotor. The designer might provide two or more rotor-slots rather than just one, as explained previously.

A major function of the tool is to impose pulses onto the liquid being injected, and, as mentioned, it is important in many cases of injection of liquids into the ground, that each pulse should have a very rapid rise-time. That is to say, the pulse-aperture of the tool should open as rapidly as possible, preferably explosively.

The rotor-aperture in the rotor and the insert-aperture in the insert should be so configured as to provide this rapid opening. When these apertures are in liquid-flow alignment with each other, they create the pulse-aperture. When the rotor-aperture and the insert-aperture are in the form of elongated rotor- and insert-slots, the pulse-aperture created by the alignment of those slots also has the form of an elongated pulse-slot.

The pulse-slot is of a long-by-narrow shape. The long length of the pulse-slot is measured in a direction parallel to the axis of rotation, and the narrow width of the pulse-slot is aligned at right angles to the axis of rotation. As the rotor rotates, the width of the pulse-slot starts at zero just as the pulse-slot cracks open, then increases to a maximum, and then closes to zero. While the rotor-slot remains out of alignment with the insert-slot, the pulse-slot of the pulse-injection tool remains closed.

(The designer might wish to arrange for a bypass flow, which bypasses the pulse injection tool. The bypass may be built into the tool body. The bypass enables injection flow to be present throughout the pulse-cycle, even when the pulse-aperture is closed.)

The long edges of the rotor-slot and of the insert-slot—being the edges that move away from each other as the pulse-slot opens—are termed the leading-edges of the pulse-slot. For the opening of the pulse-slot to be explosive, the leading-edges should be parallel to each other.

Attention is drawn to the dimensions of the pulse-slot, as created when the insert-slot and the rotor-slot are in alignment. The dimensions are related to the diameter OC-D cm of the outlet-connector 38—assuming that to be circular.

The length of the pulse-slot (being PS-L cm, measured parallel to the axis of rotation) preferably should be about OC-D×1.3, or more. The width of the pulse-slot (PS-W cm) varies between zero and a maximum value, termed PS-Wmax cm. PS-Wmax preferably should be OC-D×0.6, or less. Preferably, PS-Wmax should be about one-third of PS-L, or less.

As mentioned, the leading-edge 83 of the insert-slot 85 should be parallel to the leading-edge 87 of the rotor-slot 65, and preferably the two leading-edges should be parallel to the axis of rotation.

The maximum area of the pulse-slot (being PS-Amax, where PS-Amax=PS-L×PS-Wmax), when fully open, preferably should be about the same as the liquid-conducting throat-area of the outlet-connector, being about $0.8 \times (OC\text{-}D)^2$, or larger. (The real value of PS-Amax would be a little smaller than the value indicated by the above formula, given that the pulse-slot has rounded corners.)

The manner in which pulse-injection operates will now be described. When the pulse commences, the liquid pressure downstream of the pulse-aperture rises. If the liquid pressure rises very rapidly, a shock-wave is created. The faster the rise time of the liquid pressure, as the pulse commences, the greater the energy-content of the shockwave, and the greater its penetrative power.

The pressure pulse, along with its high-energy shock-wave, travels along the downhole-conduit to the point of injection, at depth. To depths of about fifty meters, it can be expected that the pulses are still intact. It can be expected also that the shock-wave associated with the explosive start of the pulse, when the shock-wave emerges out into the ground formation surrounding the borehole, also retains much of its energy-content. Preferably, the downhole-conduit should be made of rigid metal: if the downhole-conduit were e.g a flexible hose, the pulses and shockwave would or might be severely attenuated upon reaching injection depth.

It can be expected that the shockwave will penetrate greater distances, radially out from the borehole, than the actual liquid being pulse-injected.

Thus, an ongoing program of injecting liquid into a borehole in the ground can be expected to take place as a series of phases. At first, imposing pulses on the injected liquid can be expected to cause the liquid to fill up the (porous) ground formation around the borehole more effectively and more thoroughly than simply injecting the liquid under static pressure.

When the imposed pulses are also accompanied by high-energy shockwaves, the shockwaves penetrate the ground and cause a momentary increase in the porosity of the ground formation material (i.e a momentary increase in the size of the pores), at a point in the ground, as the shockwave propagates through that point. This momentary loosening can be very effective in allowing the liquid being injected, under pressure, into the formation, to penetrate a little further outwards from the borehole, each pulse.

Thus, pulse-injection, and especially pulse-injection-plus-shockwaves, enables the ground formation around the borehole to become more thoroughly saturated, for greater radial distances.

The ability of the shockwave to propagate through the ground depends on the state of saturation of the ground. If the ground is unsaturated, the shockwave quickly dissipates. As the ground becomes more saturated (as liquid injection proceeds over a period of time), the shockwaves can penetrate further, e.g a distance of several tens of meters outwards from the well.

Thus, a first phase of an injection program is concerned mainly with raising the liquid-content of the ground formation to a saturation level. During this first phase, whether or not pulses are imposed on the liquid being injected is not so important—although pulsing even during this first stage can be effective e.g to alleviate fingering of the injected liquid.

The second phase starts as the ground becomes saturated, i.e the ground formation becomes capable of sustaining a back pressure resistance during injection. Now, the benefits of pulsing (as opposed to static injection) become more marked, in terms of enabling more liquid to be injected into the already-saturated ground, and of enabling the liquid to penetrate radially further out into the formation.

The third phase starts as the ground formation reaches the limit of the pulse-induced over-saturation. At this point, the ground is so saturated, and the back pressure in the ground is so high, that, just after the pulse-valve closes, the back pressure can even be higher than the liquid pressure remaining in the outlet-connector; in that case, a tendency might exist for liquid to flow back into the well, from the formation, during the closed-portion of the overall pulse cycle. When such "suckback" does occur, it can be beneficial in causing the liquid in the ground outside the well to become unified into a single coherent body of liquid, through which the pulses and shockwaves can propagate very efficiently—enabling, in turn, the over-saturation condition of the formation to be extended radially further outwards.

The tools as described herein are capable of imposing cyclic pressure-pulses onto the injected liquid, and are capable also of imposing shockwaves onto those pulses. Thus, the full potential of the tool usually will be realised during the third phase of an injection program.

However, even though the tool as described herein would be selected for the injection program because of its performance during the third phase, nevertheless the tool is equally if not more effective, compared with other types of injection tool, during the earlier phases (assuming the other tools would be operated likewise under the usual regime of limited injection pressures).

As mentioned, the designer should take steps to minimize the attenuation experienced by the shockwaves and the pulses as they travel along the downhole-conduit. In the design of FIGS. 11,12, the insert-slot 85 receives the liquid that has just passed through the pulse-aperture, and the transition 89 conveys that liquid directly into the outlet-connector 58, and thence into the down-hole conduit 76.

The insert 56 includes a thin-walled tube 90, which fits snugly in the hole of the outlet-connector 58, whereby the liquid is moved into the down-hole conduit with a minimum of opportunities to enter nooks and crannies within the tool, on the downstream side of the pulse-slot. When the liquid-flow conducting conduits are smooth and unbroken, the dissipation and attenuation of energy in the pulses and shockwaves is minimized.

In the design of FIGS. 11,12, the insert is pressed against the rotor, whereby the female curved-faces of the insert 56 make contact with the male curved-faces of the rotor 25, thereby creating a liquid-seal around the pulse-aperture.

In FIG. 11, the rotor is so oriented that the pulse-aperture is closed. At this time, the liquid pressure in the outlet-connector (being the down-hole pressure) is falling, and the pressure (being the supply pressure) inside the hollow interior of the rotor 52, and inside the housing 54, is rising.

In FIG. 12, the rotor is turning clockwise, and is so oriented that the pulse-aperture, though closed, is just about to open. That is to say, the leading-edge 87 of the rotor-slot 65 just coincides with the leading-edge 83 of the insert-slot 85.

It may be noted that, in FIGS. 11,12, the resulting pressure differential acting on the insert, urging the insert towards the rotor, is, or can be, the same, whether the insert is associated with the inlet-connector (FIGS. 1-9) or with the outlet-connector (FIGS. 11,12), since the zone 92 behind the insert is at the reservoir or supply pressure. The areas of the insert over which the pressures effectively act is different, however, as between the FIGS. 1-9 arrangement and the FIGS. 11,12 arrangement, and therefore the biasing force exerted by the pressure differential is different.

In FIGS. 11,12, the spring 63 assists in creating the desired amount of biasing force on the insert 56, as will ensure that the pulse-aperture, when closed, is effectively sealed. It may be noted that (cold) liquid is passing constantly through the tool, which helps to keep the rubbing faces from overheating, even though pressed quite tightly together.

The tool has been described as it relates to the injection of liquids into the ground. Often, the liquid will be plain water. However, sometimes, the liquid will contain air or other gases entrained or dissolved therein. Such gases tend to bubble out of the liquid as the pressure of the liquid drops. This could be a problem if the amount of gas is sufficient to prevent the liquid itself from filling the pores of the ground formation, and thus to prevent the body of liquid in the ground from taking on the characteristics of a unitary coherent body.

The reference numerals used in this specification are:
20 pulse-creating tool
23 body
25 rotor
27 bearings, body to rotor
29 coupling
30 electric motor
32 threaded hole for inlet-connector
34 threaded hole for outlet-connector
36 inlet-connector
38 outlet-connector
40 movable insert
43 rotor-slot
45 insert-slot
47 transition, slot to round, in insert
50 variant of pulse-creating tool
52 rotor
54 body (or housing) of tool
56 insert 58 outlet-connector
60 inlet-connector
63 spring
65 rotor-slot
67 annular wall of rotor
69 hollow interior chamber of rotor
70 reservoir-conduit
72 reservoir
74 liquid injection pump
76 downhole-conduit
78 perforations in well-casing
83 leading-edge of insert-slot
85 insert-slot
87 leading-edge of rotor-slot
89 transition
90 thin-walled-tube of insert
92 zone behind insert.

The designations of some of the dimensions of the tool, as used herein, are:
OC-D liquid-conducting throat diameter of outlet-connector
PS-L length of pulse-slot (measured parallel to rotor axis)
PS-W width of pulse-slot (arcuate, right angles to axis)
PS-Wmax width of pulse-slot when fully open
PS-Amax throat area of pulse-slot when fully open.

The invention claimed is:

1. A tool for generating pulses in a flow of liquid passing through the tool, wherein:
    the tool includes a body, and the body includes an inlet port and an outlet port, for conveying the liquid into and out of the tool;
    the tool includes a rotor, which is mounted in the body for rotation about an axis;
    the rotor has a curved-face, which is circular with respect to the axis of rotation;
    the tool includes an insert, and includes an insert-guide;
    the insert-guide is structured to guide the insert for movement relative to the body towards and away from the rotor, in a guided-direction;
    the guided-direction is either perpendicular to the axis of rotation or has a major perpendicular component;
    the insert has a curved-face, which is so profiled as to complement the curved-face of the rotor;
    the insert includes a through-hole in its curved-face, termed the insert-aperture, which is open to a through-flow of liquid;
    the rotor includes a through-hole in its curved-face, termed the rotor-aperture, which is open to the through-flow of liquid;
    one of the apertures is fluidly connected to the inlet port and the other to the outlet port;
    the tool is so structured that, in operation, with the rotor rotating, and with liquid being passed through the tool under pressure, from the inlet port to the outlet port:
    (a) the insert is biased into contact with the rotor;
    (b) the curved-face of the insert makes rubbing contact with the complementary curved-face of the rotor, curved-face to curved-face;
    (c) the rotor-aperture alternates cyclically, in time with the rotation of the rotor, between being in liquid-flow-conducting alignment with the insert-aperture, and being out of alignment;
    (d) a liquid-flow-conducting pulse-aperture opens between the rotor-aperture and the insert-aperture when the rotor-aperture and the insert-aperture are in alignment;
    (e) the pulse-aperture alternately opens and closes, on a repeating cycle, in time with revolutions of the rotor, whereby the liquid that emerges from the outlet-port emerges in cyclic pulses.

2. As in claim 1, wherein:
    the curved-face of the rotor is a male right cylinder, being a solid of rotation with respect to the axis;
    the curved-face of the insert is an insert-sector of a complementary female right cylinder;
    the insert is so structured that:—
    (a) the insert-sector occupies less than 180° of the male right cylinder;
    (b) the insert-aperture is symmetrically disposed about a plane that is parallel to the guided-direction, and is radial to the axis of rotation; and
    (c) the sector is symmetrically disposed about the same plane.

3. As in claim 1, wherein:
    the insert-aperture has the form of a long narrow insert-slot;
    the rotor-aperture has the form of a long narrow rotor-slot;
    the insert-slot and the rotor-slot have respective leading-edges, being those edges of the slots that, as the two slots come into alignment, during rotation, are the edges of the slots that move apart from each other;
    the leading-edges of the slots are parallel to each other.

4. As in claim 1, wherein:
    one of either an inlet-connector or an outlet-connector is here termed the connector;
    the connector has a circular liquid-flow-conducting throat;
    the insert-aperture is characterizable, as to its length-by-width shape, as a long-by-narrow insert-slot;
    the insert includes a liquid-flow-conducting transition connecting the circular throat with the insert-aperture;
    the transition is so configured as to ensure that changes in velocity of liquid flow, as the liquid flow passes between the circular throat and the insert-aperture, are smooth and gradual.

5. As in claim 1, wherein the tool is so structured that, during operation of the tool:
    the insert-aperture is in liquid-flow-conducting communication with an inlet connector;
    the rotor-aperture is in liquid-flow-conducting communication with an outlet connector.

6. As in claim 5, wherein the tool is so structured that, during operation of the tool:
    the insert has upstream-facing surfaces, which are exposed to direct velocity impingement by incoming liquid under pressure;
    the insert has downstream-facing surfaces, which are not subjected to velocity impingement;
    the downstream-facing surfaces of the insert are smaller than the upstream-facing surfaces;
    whereby the insert is biased into rubbing contact with the rotor.

7. As in claim 1, wherein the tool is so structured that, during operation of the tool:
    the insert-aperture is in liquid-flow-conducting communication with an outlet connector;
    the rotor-aperture is in liquid-flow-conducting communication with an inlet connector.

8. As in claim 7, wherein the tool is so structured that, during operation of the tool:
    the rotor is formed with a hollow interior chamber;
    liquid passes from the inlet connector into the chamber, then from there through the rotor-aperture, then from there through the insert-aperture, then from there through the outlet connector.

9. As in claim 7, wherein the insert is biased into forceful rubbing contact by means of a mechanical spring.

10. As in claim 1, wherein the tool is so structured that, during operation of the tool:
- a portion of the curved-face of the insert makes rubbing contact with the curved-face of the rotor, that portion being termed the rubbed-portion;
- the insert-aperture and the rotor-aperture being in at-least-partial alignment whereby the pulse-aperture is created, the pulse-aperture is encircled by the rubbed-portion; and
- the pulse-aperture is thereby sealed against leakage of liquid between the curved face of the insert and the curved face of the rotor.

11. As in claim 1, wherein the pulse-aperture is in the form of a long narrow pulse-slot, in that:
- the pulse-slot has a length,
- the pulse-slot has a maximum width;
- the maximum width is one third of the length, or less.

12. As in claim 1, wherein the pulse-aperture is in the form of a long narrow pulse-slot, in that:
- the pulse-slot has a length,
- the outlet connector has a circular liquid-flow-conducting throat, having a diameter;
- the length is 1.3 times the diameter, or more.

13. Combination of a hole in the ground with a tool that embodies claim 1, wherein:
- the tool is located at ground surface, and the combination includes: —
- (a) at surface, a reservoir of pressurized liquid, and a reservoir-conduit for conveying the liquid to the inlet-port;
- (b) at surface, a motor for driving the rotor in rotation;
- (c) a downhole-conduit, which is capable of conveying liquid from the outlet port down into the hole;
- a working depth of the hole is the depth, in the hole, at which the pulsating liquid is discharged from a bottom end of the downhole-conduit; and
- the working-depth is a distance from the outlet port of the tool, of fifty meters, or less.

\* \* \* \* \*